Patented Dec. 5, 1950

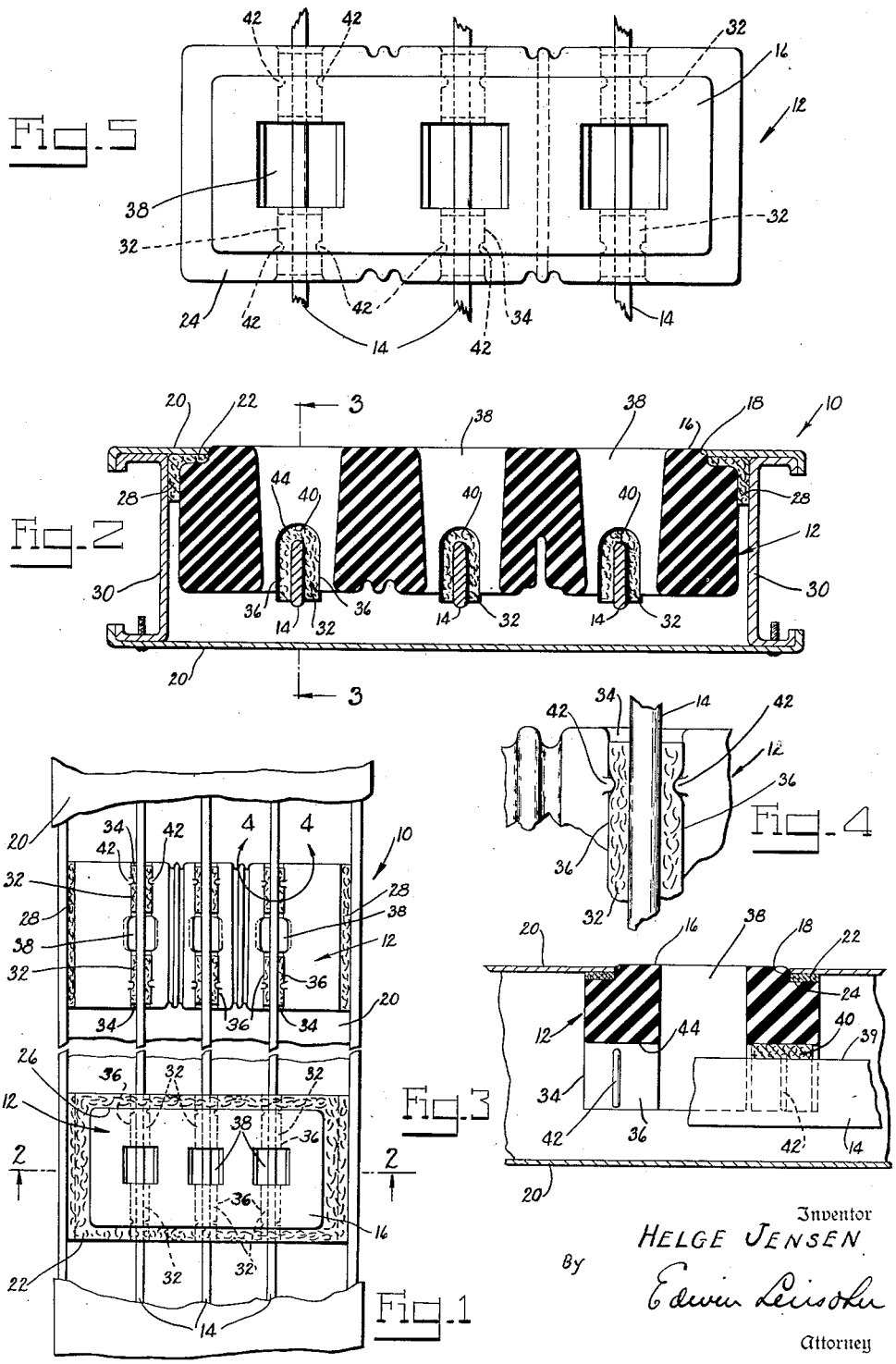

2,532,845

UNITED STATES PATENT OFFICE 2,532,845

INSULATION SUPPORT FOR BUS BARS

Helge Jensen, Flushing, N. Y., assignor, by mesne assignments, to Federal Electric Products Company, Newark, N. J.

Application May 9, 1946, Serial No. 668,537

8 Claims. (Cl. 174—171)

This invention relates to bus bar supports and more particularly to insulation blocks for holding and supporting bus bars.

The insulation blocks or bus bar supports of the present invention are intended primarily for use in bus ducts, for example, in bus ducts of the construction shown in the patent to Cole et al., No. 2,306,353, granted December 22, 1942, or in other bus ducts, and the primary object of the present invention is to provide means for preventing the bus bars from coming in contact with the insulation block or support. In the use of bus ducts it sometimes happens that the bus bars are subjected to forces, particularly under abnormal circuit conditions, such as, for example, short circuits or heavy overloads, which cause the bus bars to strike the insulation blocks, which are ordinarily made of porcelain or other ceramic material, with sufficient force to crack or break said blocks. This objection is obviated by the present invention.

The above and other objects, features and advantages of this invention will be fully understood from the following description, reference being had to the accompanying illustrative drawings.

In the drawings:

Fig. 1 is a view of a part of a bus duct, with a portion of the side wall thereof broken away for the purpose of illustration;

Fig. 2 is a sectional view, on a larger scale, on line 2—2 of Fig. 1;

Fig. 3 is a sectional view on the line 3—3 of Fig. 2, a part of the bus bar being cut away for the purpose of illustration;

Fig. 4 is a view, on a larger scale, of the part shown encircled in Fig. 1;

Fig. 5 is an outer side view of one of the blocks or insulation supports, showing the bus bars in position.

Referring now to the drawings in detail, there is shown a bus duct 10 which, as illustrated, is of the construction shown and described in the above mentioned patent to Cole et al., said bus duct being as here shown of the plug-in type. As described in said patent, a plurality of porcelain or ceramic insulation blocks 12 are arranged in the duct for supporting the naked bus bars 14. Each insulation block 12 is provided with a raised portion 16 which projects through and fits, with slight clearance, in a companion opening 18 in the adjacent side wall 20 of the bus duct. As described in said patent, the opposite side walls 20 of the bus duct are provided with longitudinally spaced openings and the bus blocks 12 are disposed in spaced relation longitudinally of the duct, alternate blocks having their raised portions facing in opposite directions, for the entrance of branch outlet plugs into the duct at opposite sides thereof. As is illustrated in Figs. 1, 2 and 3, a cushioning pad 22, which is preferably formed of felt is positioned on the shoulder 24 of the bus block, said felt pad 22 having a rectangular opening 26 in which the raised portion 16 of the block fits. Said felt pad 22 is preferably of the same width as the companion block 12 but is longer than the latter so as to provide projecting end portions 28 which are disposed between the ends of the block and the adjacent walls 30, respectively, of the duct, the portion of the cushioning pad 22 which is seated on the shoulder 24 of the block being disposed between the latter and the confronting inner surface portion of the adjacent wall 20 of the duct. Thus, resilient cushioning means are provided between the insulation blocks 12 and the walls of the duct.

Provision is made, in accordance with the present invention for preventing direct engagement between the bus bars 14 and the insulation blocks 12 by which said bus bars are supported. More particularly, in accordance with the present invention, strips 32 of felt or equivalent material are positioned in the grooves 34 in which the bus bars 14 are mounted. Said grooves are defined by laterally spaced confronting inner walls 36 which register with the plug-in openings 38. The space between the confronting groove-defining walls 36 is greater than the thickness of the bus bar 14, to make room for the cushioning strip 32 which is positioned in said groove. It will be noted that each cushioning strip 32 is folded over the inner edge 39 of the bus bar which is positioned in said groove. Preferably the cushioning strips 32 are of such thickness that said strips are compressed by the bus bars when the latter are positioned in the grooves of the insulation block. The groove-defining walls 36 are provided with means for preventing movement of the cushioning strips 32 longitudinally of the companion grooves 34, said means being as here shown in the form of integral half-round ribs 42 which project toward each other from the inner groove-defining walls 36. It will be noted that the portions of the cushioning strip 32 which are engaged by the ribs 42 are compressed to a greater degree than the other portions of the cushioning strips whereby said cushioning strips are held against movement longitudinally of the companion grooves 34. It will be noted that each cushioning strip 32 extends for substantially the full length of the companion groove 34 and is therefore effective to prevent the bus bar from engaging said groove-defining walls in the event of the occurrence in the bus duct of abnormal conditions which would give rise to forces tending to move said bus bars transversely of said grooves. Also it will be noted that the folded portion 40 of each cushioning member 32 prevents engagement of the inner edge of the bus bar with the inner end 44 of each groove 34. Although the bus bars have a close fit in the cushioning strips 32 in the grooves, said bus bars can be moved longitudinally of the duct, when necessary, without displacing the cushioning strips.

It will be understood that although the invention is illustrated in connection with bus ducts of the plug-in type which accordingly include insulation blocks having plug-in openings, the present invention may be embodied in feeder or other ducts which are ordinarily not provided with plug-in openings and which therefore comprise insulation blocks or bus bar supports which are usually not provided with plug-in openings. Also it will be understood that various changes in the details of construction and in the arrangement of parts may be made without departing from the underlying idea or principles of the present invention within the scope of the appended claims.

Having thus described my invention, what I claim and desire to secure by Letters Patent, is:

1. A bus bar support comprising a block of insulation material provided with internal laterally spaced confronting walls defining a groove of uniform width and wide enough to receive a bus bar with the opposite sides of the bus bar spaced from said walls, respectively, and with cushioning means for the bus bar disposed in said bus bar receiving groove between said opposite sides of the bus bar and the adjacent groove-defining walls, respectively, whereby to prevent engagement of the bus bar with said groove-defining walls in the event of movement of the bus bar transversely of said groove under abnormal circuit conditions said cushioning means extending substantially the full length of said groove, and means in said groove in fixed disposition relative to said bus bar, said cushioning means being compressed between said bus bar and said fixed means for preventing movement thereof longitudinally of said groove.

2. A bus bar support comprising a block of insulation material provided with internal laterally spaced confronting walls defining a groove of uniform width and wide enough to receive a bus bar with the opposite sides of the bus bar spaced from said walls, respectively, and with cushioning means for the bus bar disposed in said bus bar receiving groove between said opposite sides of the bus bar and the adjacent groove-defining walls, respectively, whereby to prevent engagement of the bus bar with said groove-defining walls in the event of movement of the bus bar transversely of said groove under abnormal circuit conditions, said cushioning means extending substantially the full length of said groove, and means integral with and projecting from at least one of said walls into said groove in position to engage said cushioning means for preventing movement thereof longitudinally of said groove.

3. A bus bar support comprising a block of insulation material provided with internal laterally spaced confronting walls defining a groove of uniform width and wide enough to receive a bus bar with the opposite sides of the bus bar spaced from said walls, respectively, cushioning means for the bus bar disposed in said bus bar receiving groove between said opposite sides of the bus bar and the adjacent groove-defining walls, respectively, whereby to prevent engagement of the bus bar with said groove-defining walls in the event of movement of the bus bar transversely of said groove under abnormal circuit conditions, said cushioning means extending substantially the full length of said groove, and means integral with and projecting from a portion of at least one of said walls into said groove and engaging said cushioning means for preventing movement thereof longitudinally of said groove.

4. A bus bar support comprising a block of insulation material provided with internal laterally spaced confronting walls defining a groove of uniform width and wide enough to receive a bus bar with the opposite sides of the bus bar spaced from said walls, respectively, cushioning means for the bus bar disposed in said bus bar receiving groove between said opposite sides of the bus bar and the adjacent groove-defining walls, respectively, whereby to prevent engagement of the bus bar with said groove-defining walls in the event of movement of the bus bar transversely of said groove under abnormal circuit conditions, said cushioning means extending substantially the full length of said groove said cushioning means comprising a member formed of felt and disposed for engaging the bus bar at the inner edge and at said opposite sides thereof and means in said groove in fixed disposition relative to said bus bar, said cushioning means being compressed between said bus bar and said fixed means for preventing movement thereof longitudinally of said groove.

5. A bus bar support comprising a block of insulation material provided with internal laterally spaced confronting walls defining a groove of uniform width and wide enough to receive a bus bar with the opposite sides of the bus bar spaced from said walls, respectively, cushioning means for the bus bar disposed in said bus bar receiving groove between said opposite sides of the bus bar and the adjacent groove-defining walls, respectively, whereby to prevent engagement of the bus bar with said groove-defining walls in the event of movement of the bus bar transversely of said groove under abnormal circuit conditions, said cushioning means extending substantially the full length of said groove said cushioning means comprising a member formed of felt and disposed for engaging the bus bar at the inner edge and at said opposite sides thereof, and means integral with and projecting from at least one of said walls and engaging said member for preventing movement thereof longitudinally of said groove.

6. A bus bar support comprising a block of insulation material provided with internal laterally spaced confronting walls defining a groove of uniform width and wide enough to receive a bus bar with the opposite sides of the bus bar spaced from said walls, respectively, and with cushioning means for the bus bar disposed in said bus bar receiving groove between said opposite sides of the bus bar and the adjacent groove-defining walls, respectively, whereby to prevent engagement of the bus bar with said groove-defining walls in the event of movement of the bus bar transversely of said groove under abnormal circuit conditions, said cushioning means extending substantially the full length of said groove and integral projections on said groove-defining walls extending transversely of the opposite sides of the bus bars and engaging said cushioning means for preventing movement thereof longitudinally of said groove.

7. A bus bar support comprising a block of insulation material provided with internal laterally spaced confronting walls defining a groove of uniform width and wide enough to receive a bus bar with the opposite sides of the bus bar spaced from said walls, respectively, cushioning means for the bus bar disposed in said bus bar receiving groove between said opposite sides of the bus bar and the adjacent groove-defining walls, respectively, whereby to prevent engagement of the bus bar with said groove-defining walls in the event of movement of the bus bar transversely of said groove under abnormal circuit conditions, said cushioning means extending substantially the full length of said groove said cushioning means comprising a member formed of felt and disposed for engaging the bus bar at the inner edge and at said opposite sides thereof, and integral projections on said groove-defining walls extending transversely of the opposite sides of the bus bar and engaging said member for preventing movement thereof longitudinally of said groove.

8. A bus bar support comprising a block of insulation material provided with internal laterally spaced confronting walls defining a groove of uniform width and wide enough to receive a bus bar with the opposite sides of the bus bar spaced from said walls, respectively, cushioning means for the bus bar disposed in said bus bar receiving groove between said opposite sides of the bus bar and the adjacent groove-defining walls, respectively, whereby to prevent engagement of the bus bar with said groove-defining walls in the event of movement of the bus bar transversely of said groove under abnormal circuit conditions, said cushioning means extending substantially the full length of said groove said cushioning means being formed of compressible material and being partially compressed in the spaces between said groove-defining walls and the adjacent sides, respectively, of the bus bar when the latter is in position in said groove in engagement with said cushioning means, and means integral with and projecting from at least one of said walls for preventing movement of said cushioning means longitudinally of said groove, said integral means being positioned between the opposite ends of said cushioning means and projecting into said cushioning means toward the adjacent side of the bus bar in said groove.

HELGE JENSEN.

REFERENCES CITED

The following references are of record in the file of this patent:

UNITED STATES PATENTS

| Number | Name | Date |
|---|---|---|
| 1,620,552 | Jacobs | Mar. 8, 1927 |
| 2,059,986 | Frank et al. | Nov. 3, 1936 |
| 2,186,377 | Frank | Jan. 9, 1940 |
| 2,247,088 | Hill | June 24, 1941 |
| 2,306,353 | Cole et al. | Dec. 22, 1942 |
| 2,483,066 | Sigmund et al. | Sept. 27, 1949 |